United States Patent
Kreutziger et al.

(10) Patent No.: US 11,236,664 B2
(45) Date of Patent: Feb. 1, 2022

(54) LOW-PRESSURE EGR SYSTEM WITH TURBO BYPASS

(71) Applicant: TENNECO GMBH, Edenkoben (DE)

(72) Inventors: Philipp Kreutziger, Landau (DE); Michael Fischer, Mainz (DE); Jaroslaw Kierat, Frankenthal (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 16/975,909

(22) PCT Filed: Feb. 28, 2019

(86) PCT No.: PCT/EP2019/054933
§ 371 (c)(1),
(2) Date: Aug. 26, 2020

(87) PCT Pub. No.: WO2019/166528
PCT Pub. Date: Sep. 6, 2019

(65) Prior Publication Data
US 2020/0408141 A1    Dec. 31, 2020

(30) Foreign Application Priority Data
Feb. 28, 2018 (DE) ............... 10 2018 104 599.9

(51) Int. Cl.
*F02B 37/18* (2006.01)
*F02M 26/05* (2016.01)
(Continued)

(52) U.S. Cl.
CPC ............. *F02B 37/18* (2013.01); *F01N 3/031* (2013.01); *F01N 3/035* (2013.01); *F01N 3/101* (2013.01);
(Continued)

(58) Field of Classification Search
CPC ........ F01N 13/009; F01N 3/021; F01N 3/031; F01N 3/035; F01N 3/101; F01N 3/20;
(Continued)

(56) References Cited

U.S. PATENT DOCUMENTS 5,582,005 A    12/1996  Wunderlich et al.
6,311,494 B2 *  11/2001  McKinley ............... F02D 9/04
                                                  60/605.2

(Continued)

FOREIGN PATENT DOCUMENTS

DE    102014118813 A1    6/2016
DE    102015108223 A1   12/2016
(Continued)

OTHER PUBLICATIONS

JPH07259654 Translation; Akagawa (Year: 1994).*

*Primary Examiner* — Jesse S Bogue
(74) *Attorney, Agent, or Firm* — Harness, Dickey & Pierce, P.L.C.

(57) ABSTRACT

The disclosure relates to an exhaust gas conduction system for a gasoline engine, comprising an exhaust gas line which can be connected to an exhaust manifold of the gasoline engine, an intake line which can be connected to an intake manifold of the gasoline engine, a charge air compressor which is arranged in the intake line, and a turbine which is arranged in the exhaust gas line. The exhaust gas line has at least one bypass line with a bypass throttle valve, said line branching off from the exhaust gas line upstream of the turbine and branching back into the exhaust gas line at an opening downstream of the turbine. At least one exhaust gas recirculation line with an EGR throttle valve is provided, said line opening into the intake line, wherein the exhaust gas recirculation line branches off from the bypass line at a branch, and the bypass throttle valve is arranged upstream of the branch of the exhaust gas recirculation line. At least one
(Continued)

particle filter is arranged in the bypass line downstream of the branch of the exhaust gas recirculation line, and an exhaust gas valve is provided in the exhaust gas line upstream of the opening of the bypass line.

14 Claims, 3 Drawing Sheets

(51) Int. Cl.

| | |
|---|---|
| *F02M 26/06* | (2016.01) |
| *F02M 26/07* | (2016.01) |
| *F02M 26/15* | (2016.01) |
| *F02M 26/23* | (2016.01) |
| *F02M 26/35* | (2016.01) |
| *F02M 26/42* | (2016.01) |
| *F01N 3/031* | (2006.01) |
| *F01N 3/035* | (2006.01) |
| *F01N 3/10* | (2006.01) |
| *F01N 3/20* | (2006.01) |
| *F02B 47/08* | (2006.01) |

(52) U.S. Cl.
CPC ............... *F01N 3/20* (2013.01); *F02B 47/08* (2013.01); *F02M 26/05* (2016.02); *F02M 26/06* (2016.02); *F02M 26/07* (2016.02); *F02M 26/15* (2016.02); *F02M 26/23* (2016.02); *F02M 26/35* (2016.02); *F02M 26/42* (2016.02)

(58) Field of Classification Search
CPC ........ F01N 3/2053; F02B 37/18; F02B 47/08; F02M 26/05; F02M 26/06; F02M 26/07; F02M 26/15; F02M 26/23; F02M 26/35; F02M 26/42; Y02T 10/12
See application file for complete search history.

(56) References Cited

U.S. PATENT DOCUMENTS

| | | | | |
|---|---|---|---|---|
| 6,973,786 | B1* | 12/2005 | Liu | F02M 26/07 |
| | | | | 123/559.2 |
| 7,168,250 | B2* | 1/2007 | Wei | F02M 26/08 |
| | | | | 60/605.2 |
| 7,302,939 | B2* | 12/2007 | Hill | F02D 19/0689 |
| | | | | 123/568.12 |
| 7,444,804 | B2* | 11/2008 | Hashizume | F02M 26/15 |
| | | | | 60/297 |
| 8,001,779 | B2* | 8/2011 | Styles | F02M 26/24 |
| | | | | 60/605.2 |
| 9,404,448 | B2 | 8/2016 | Gokhale | |
| 9,593,619 | B2 | 3/2017 | Zhang | |
| 10,215,135 | B2* | 2/2019 | Styles | F02M 35/10157 |
| 10,316,801 | B2* | 6/2019 | Zhang | F02M 26/24 |
| 2011/0000470 | A1* | 1/2011 | Roth | F02D 13/0249 |
| | | | | 123/568.11 |
| 2011/0302918 | A1* | 12/2011 | Vollmer | F02M 26/06 |
| | | | | 60/605.2 |
| 2016/0097320 | A1* | 4/2016 | Ohrem | F02M 26/05 |
| | | | | 60/599 |
| 2016/0177887 | A1 | 6/2016 | Fischer | |
| 2016/0348615 | A1* | 12/2016 | Fischer | F02M 26/22 |
| 2021/0140394 | A1* | 5/2021 | Kreutziger | F01N 3/031 |

FOREIGN PATENT DOCUMENTS

| | | | |
|---|---|---|---|
| DE | 202017105126 U1 | | 9/2017 |
| JP | H07259654 | * | 3/1994 |
| JP | 3046707 B2 | | 5/2000 |
| WO | 2015004497 A1 | | 1/2015 |
| WO | 2016189028 A1 | | 12/2016 |

\* cited by examiner

LOW-PRESSURE EGR SYSTEM WITH TURBO BYPASS

CROSS-REFERENCE TO RELATED APPLICATIONS

This application is a U.S. National Phase Application under 35 U.S.C. 371 of International Application No. PCT/EP2019/054933, filed on Feb. 28, 2019, which claims the benefit of German Patent Application No. 10 2018 104 599.9, filed on Feb. 28, 2018. The entire disclosures of the above applications are incorporated herein by reference.

FIELD

The disclosure relates to an exhaust gas conduction system for a gasoline engine, comprising an exhaust gas line which can be connected to an exhaust manifold of the gasoline engine, an intake line which can be connected to an intake manifold of the gasoline engine, and a charge air compressor which is arranged in the intake line, and a turbine which is arranged in the exhaust gas line, wherein the exhaust gas line has at least one bypass line with a bypass throttle valve, said line branching off from the exhaust gas line upstream of the turbine and branching back into the exhaust gas line at an opening downstream of the turbine, and wherein at least one exhaust gas recirculation line with an EGR throttle valve is provided, said line opening into the intake line, wherein the exhaust gas recirculation line branches off at a branch on the bypass line, wherein the bypass throttle valve is arranged upstream of the branch of the exhaust gas recirculation line, and wherein an exhaust gas valve is provided in the exhaust gas line upstream of the opening of the bypass line.

The disclosure further relates to a method for operating a gasoline engine, comprising such an exhaust gas conduction system.

BACKGROUND

This section provides background information related to the present disclosure which is not necessarily prior art.

An exhaust gas conduction system for a gasoline engine is already known from DE 10 2015 108 223 A1. The exhaust gas conduction system has an exhaust gas recirculation line which opens in the intake line upstream of the compressor. Additionally, a bypass line is provided for the turbine, on which the exhaust gas recirculation line branches off. A particle filter is arranged in the exhaust gas recirculation line, wherein the particle filter has a catalytically active coating for converting CO, HC and NOx.

An exhaust gas conduction system for a gasoline engine is also known from WO 2015/004497 A1. The bypass line and the exhaust gas recirculation line are connected via a 3-2-way valve, wherein the exhaust gas recirculation line branches off upstream of the turbine and opens out downstream of the compressor.

An exhaust gas conduction system for a gasoline engine with an exhaust gas recirculation line is also known from U.S. Pat. No. 9,593,619, B2.

DE 20 2017 105 126 U1 describes an exhaust gas conduction system with an exhaust gas recirculation line and a bypass line, wherein a particle filter is provided which is positioned in the bypass line upstream of the branch of the exhaust gas recirculation line.

Unlike with a diesel engine, the particle filter of a gasoline engine regenerates largely without additional active measures, i.e. under normal gasoline engine framework conditions, the particle mass retained until that point (soot particles with accumulated or embedded hydrocarbons) essentially converts to CO2 or H20 in the combustion process. For this purpose, sufficiently high exhaust gas temperatures of over 500° C. and oxygen are required in order for combustion to occur. This exhaust gas temperature is achieved in a very wide range of operations of the gasoline engine. Since the majority of gasoline engines are operated stoichiometrically, the oxygen content in the exhaust gas may be too low for a full combustion of the particle mass contained in the filter. In such cases, in transient mode, the usual overrun cut-off phases of the gasoline engine help in which the injection of the engine is switched off for consumption reasons due to the lack of load requirement by the driver.

In engine brake mode, pure air is flushed through the exhaust gas system as a result of the motored engine. This uncombusted air comes into contact with the particles in the particle filter that have been previously heated. If the temperature is sufficiently high, these particles catch fire and combust to gases that can escape through the particle filter. As a result, the particle filter is purified.

Fundamentally, a differentiation is made between three variants of the exhaust gas recirculation, depending on the branch of the EGR line from the exhaust gas line and the opening of the EGR line in the intake line. The combination of the branch of the EGR line upstream of the turbine or turbines and the opening of the EGR line downstream of the compressor or compressors is known as high-pressure EGR (HD-EGR or HP-EGR). The combination of the branch of the EGR line upstream of the turbine or turbines and the opening of the EGR line upstream of the compressor or compressors is known as maximum-pressure EGR (MD-EGR or MP-EGR). The combination used in connection with this disclosure of the branch of the EGR line downstream of the turbine or turbines and the opening upstream of the compressor or compressors is known as low-pressure EGR (ND-EGR or LP-EGR).

SUMMARY

This section provides a general summary of the disclosure, and is not a com-prehensive disclosure of its full scope or all of its features.

The object that forms the basis of the disclosure is to form and arrange an exhaust gas conduction system for a gasoline engine such that an exhaust gas recirculation is possible with an extended range of application.

The object is attained according to the disclosure in such a manner that a particle filter is arranged in the bypass line downstream of the branch of the exhaust gas recirculation line. The bypass line can thus be formed particle filter-free upstream of the branch of the exhaust gas recirculation line. As a result, it is achieved that the particle filter can be used in the EGR line not only in EGR mode, but also in bypass mode, as a result of which in cold start mode in particular, a very rapid heating or light-off is ensured. This is in particular due to the fact that the particle filter is designed for the exhaust gas volume flow to be recirculated; in other words, it is relatively small. When the gasoline engine is in partial load mode, when the bypass throttle valve is closed and the exhaust gas valve is open, the EGR exhaust gas flow is accordingly branched downstream of the turbine and flows through the particle filter in the other direction.

As with cold starting, in full load mode, during exhaust gas recirculation, the particle filter can be flowed through in the opposite direction in relation to the direction of flow, which leads to a purification of the filter as a result of regeneration.

For this purpose, it can also be advantageous when the at least one particle filter has a catalytically active 3-way coating for converting CO, HC and NOx. Thus, extensive purification of the recirculated exhaust gas is possible. Here, the cooler is protected against contamination and load with excessively acidic exhaust gas, so that optimal cooling is ensured.

Further, it can be advantageous when a cooler is provided within the exhaust gas recirculation line upstream of the EGR throttle valve and downstream of the particle filter. An optimal effect and efficiency of the cooler can be achieved due to the positioning of the cooler downstream of the particle filter.

It can also be advantageous when a 3-way exhaust gas catalytic converter and/or a particle filter is provided in the exhaust gas line. Thus, a purification of the main exhaust gas flow is achieved, in particular following sufficient heating of the exhaust gas.

Here, it can advantageously be provided that downstream of the particle filter and upstream of the opening, the bypass line is free of exhaust gas valves or exhaust gas flaps, or that only one bypass valve is provided in the bypass line downstream of the particle filter and upstream of the opening in order to improve the acoustic properties. For this reason, the exhaust gas conduction system functions without the use of an exhaust gas flap or a valve downstream of the particle filter and before the opening into the main exhaust gas tract. The use of such a bypass valve would only be necessary in cases when unfavorable and disadvantageous pulsation events occur due to the exhaust gas system architecture. This is because a suppression of the pulsation events leads to an improvement in the acoustic properties and to the avoidance of capacity deficits due to an unfavorable formation of the counter-pressure.

It can be of particular importance for the present disclosure when the bypass line is free of connecting lines to the exhaust gas line upstream of the particle filter or upstream of the branch of the exhaust gas recycling line. No further connecting lines are necessary to ensure the correct functioning of the exhaust gas conduction system.

In connection with the formation and arrangement according to the disclosure, it can be advantageous when a charge air recirculation line is provided with a branch downstream of a charge air cooler and an opening between the EGR cooler and the EGR throttle valve. Through the use of a charge air recirculation line, the regeneration intervals for the particle filter can be shortened, since in addition to the overrun mode, i.e. including with a load requirement, an increase in the oxygen content in the exhaust gas can be ensured. This increased oxygen proportion can also be used to regenerate the main particle filter.

Further, it can be advantageous when an exhaust gas diversion is provided, which branches off at a branch downstream of the particle filter and before the opening and which branches back in the exhaust gas line downstream of the 3-way catalytic converter and/or downstream of the particle filter, wherein at least one first diversion valve is positioned between the branch and the opening. Through the use of the exhaust gas diversion, the different pressure losses within the main exhaust gas line can be taken into account. When the exhaust gas has already been purified via the filter catalytic converter in the exhaust gas recirculation line or the bypass line, the 3-way catalytic converter in the main exhaust gas tract or the main particle filter can be bypassed via said diversion.

In addition, it can be advantageous when a diversion section is provided, which branches off between the branch and the first diversion valve and which branches back at an opening downstream of the particle filter, wherein a second diversion valve is provided in the diversion section. The diversion section ensures a bypass of the particle filter in the main exhaust gas tract alone. In this way, a choice can be made as to the point at which the wastegate flow of the bypass line, which flows over the particle filter with the catalytically active 3-way coating in the branch of the exhaust gas recirculation line, is introduced. In other words, before the 3-way catalytic converter, after the 3-way catalytic converter, before the particle filter in the exhaust gas line or after the particle filter in the exhaust gas line. The particle filter in the exhaust gas line can additionally also have a catalytically active 3-way coating.

Furthermore, the object is attained by a method for operating a gasoline engine with an aforementioned exhaust gas conduction system or a corresponding exhaust gas system, in which a) when the gasoline engine is in cold starting mode, the bypass throttle valve is open and the EGR throttle valve and the exhaust gas valve are closed, so that the exhaust gas flow is guided past the turbine through the bypass line and the particle filter, b) when the gasoline engine is in partial load mode, the bypass throttle valve is closed and the exhaust gas valve is open, wherein via the EGR throttle valve, depending on the operating point, an exhaust gas mass flow is adjusted within the exhaust gas recirculation line, c) when the gasoline engine is in full load mode or at least close to full load mode, the EGR throttle valve is closed and the exhaust gas valve is open, wherein via the bypass throttle valve, depending on the operating point, an exhaust gas mass flow is adjusted within the bypass line.

Finally, it can be advantageous when via the charge air recirculation line and the EGR line, charge air is guided into the exhaust gas line and the particle filter in the EGR line and/or the particle filter in the exhaust gas line is regenerated. As already explained above, as a result of a charge air recirculation, the regeneration interval for the particle filter can be shortened, since in different engine operation states, sufficient oxygen can be provided in the exhaust gas.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are explained in the claims and in the description, and portrayed in the figures, in which:

Corresponding reference numerals indicate corresponding parts throughout the several views of the drawings.

DETAILED DESCRIPTION

Example embodiments will now be described more fully with reference to the accompanying drawings.

Figure 1:
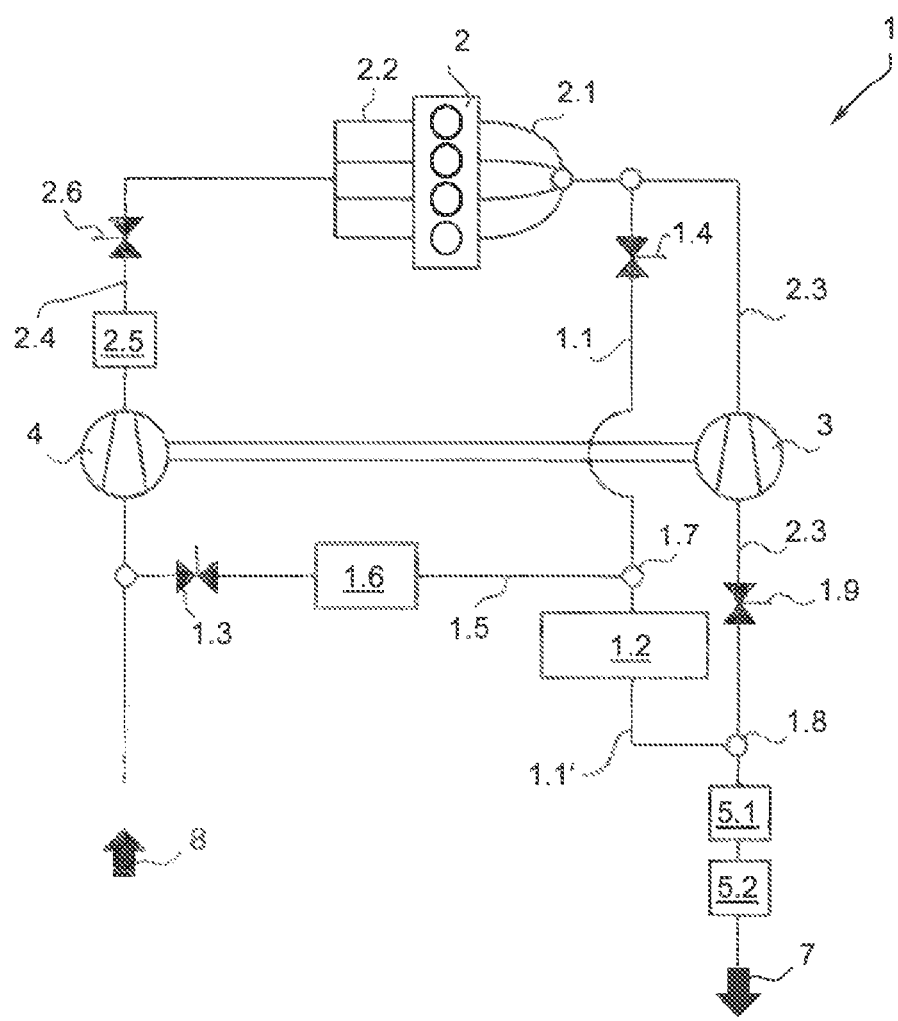
FIG. 1 shows a principle sketch of an exhaust gas conduction system with a bypass line with integrated LP-EGR.
Figure 2:
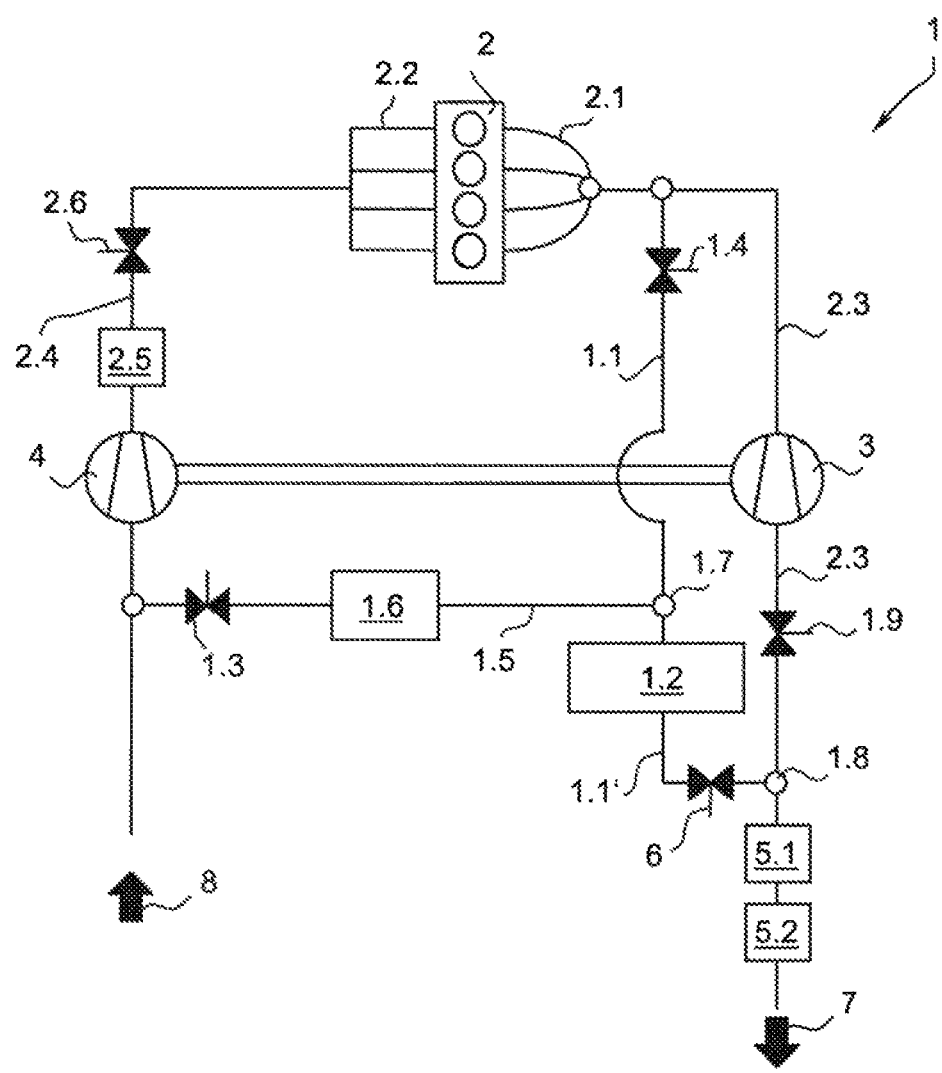
FIG. 2 shows a principle sketch according to FIG. 1 with an additional valve.
Figure 3:
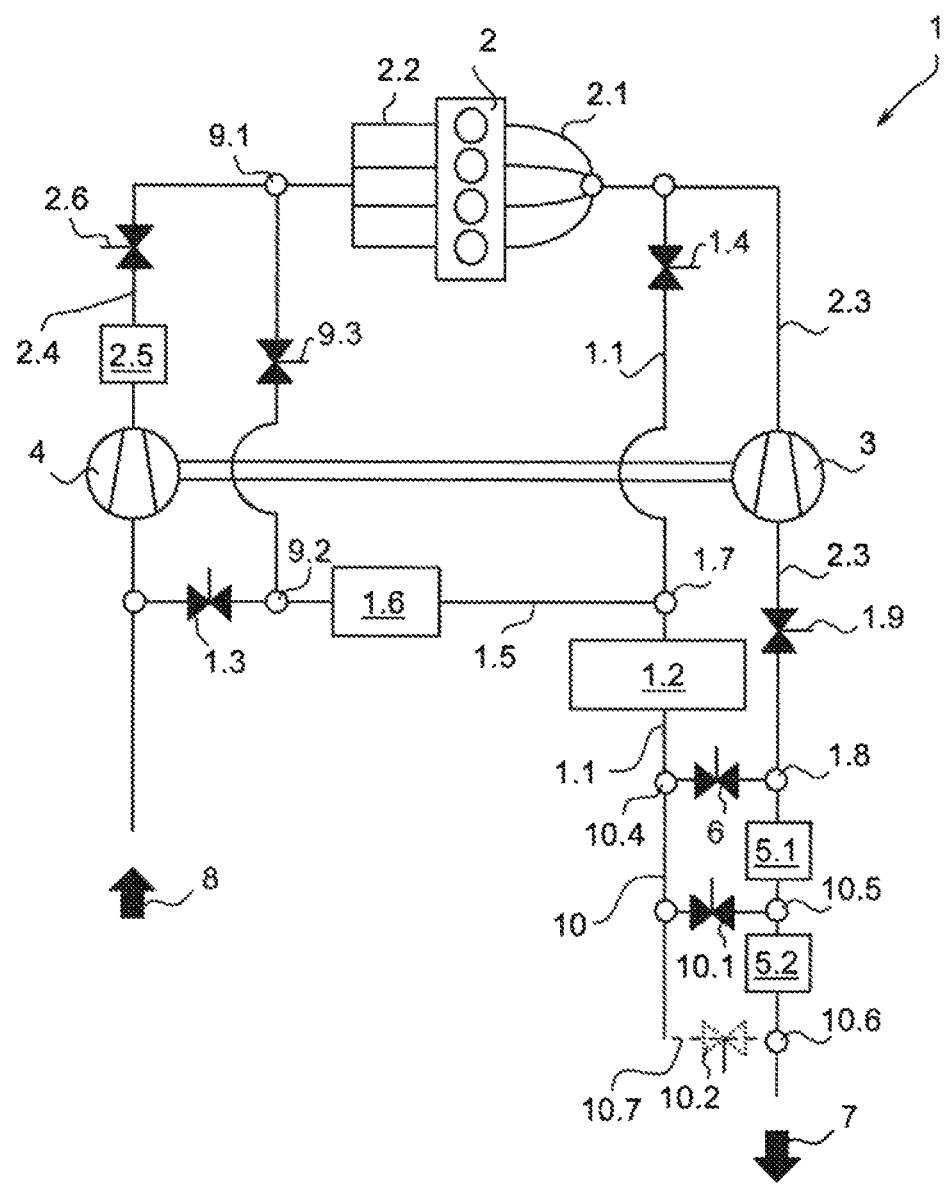
FIG. 3 shows a principle sketch according to FIG. 1 with charge air recirculation and exhaust gas diversion.

In all principle sketches according to the exemplary embodiments in FIGS. 1 to 3, an exhaust gas conduction system 1 (EGR system) is shown which is integrated into the exhaust gas and charge air system of a gasoline engine 2 with an exhaust manifold 2.1 and an intake manifold 2.2 and with an exhaust gas turbine 3 and a charge air compressor 4. The exhaust gas and charge air system has an exhaust gas line 2.3 that is connected to the exhaust manifold 2.1 of the gasoline engine 2, into which the turbine 3 is integrated. At the end of the exhaust gas line 2.3, the exhaust gas 7 leaves the exhaust gas system 1 and flows into the additional exhaust gas path not shown. Additionally, an intake line 2.4 is provided that is connected to the intake manifold 2.2 of the gasoline engine 2, into which the compressor 4 is integrated. The intake line 2.4 is supplied with fresh air 8 via an air feed system, not shown. Additionally, a bypass line 1.1 is provided that branches off from the exhaust gas line 2.3 and which branches back downstream of the turbine 3 in the exhaust gas line 2.3. The bypass line 1.1 has a bypass throttle valve 1.4 for regulating the gas mass flow.

In addition, at least one low-pressure exhaust gas recirculation line 1.5 (EGR line) is provided with an EGR throttle valve 1.3 which branches off at a branch 1.7 from the bypass line 1.1, and which branches back in the intake line 2.4 upstream of the compressor 4. The exhaust gas recirculation line 1.5 has an EGR cooler 1.6. An EGR throttle valve 1.3 for regulating the mass flow within the EG line 1.5 is positioned downstream of the EGR cooler 1.6 or before the opening into the intake line 2.4.

In order to purify the exhaust gas to be recirculated, a particle filter 1.2 is arranged in a portion 1.1' of the bypass line 1.1 that serves the exhaust gas recirculation. The particle filter 1.2 is coated with a 3-way coating and additionally performs the tasks of a 3-way catalytic converter. The particle filter 1.2 is a wall filter, wherein preferably, both wall sides are coated with a 3-way coating. This ensures an optimal catalytic converter and filter effect in both flow directions. Even when only one wall side is coated, the catalytic effect of the particle filter is ensured in both flow directions. However, the efficiency may be reduced since active centers on the catalytic converter on the inflowing side are influenced by particles and the degree of efficiency decreases as a result.

However, it is not correct that the catalytic effect is not ensured in one flow direction when only one side is coated.

An exhaust gas valve 1.9 is arranged downstream of the turbine 3 and upstream of an opening 1.8 of the bypass line 1.1. In the further path following the opening 1.8 of the bypass line 1.1, a 3-way catalytic converter 5.1 and a particle filter 5.2 are provided in the exhaust gas line 2.3. These two purification components can also be formed as a combined 4-way catalytic converter in the form of a particle filter with a 3-way coating.

A charge air cooler 2.5 and a charge air throttle valve 2.6 are provided in the intake line 2.4.

When the gasoline engine 2 is in cold start mode, the bypass throttle valve 1.4 is open. The EGR throttle valve 1.3 and the exhaust gas valve 1.9 are closed, so that the exhaust gas flow is guided through the bypass line 1.1 past the particle filter 1.2 on the turbine 3, which leads to rapid heating of the particle filter 1.2. The particle filter 1.2 is relatively small, since it is only designed for the exhaust gas volume flow to be recirculated. However, in the cold start phase, it ensures optimal pre-purification of the exhaust gas 7 before it is finally purified by the main catalytic converter, which is still cold. The catalytic effect is also ensured in this flow direction, as already described above.

When the gasoline engine 2 is in partial load mode, the bypass throttle valve 1.4 is closed and the exhaust gas valve 1.9 is open. Depending on the operating point, an exhaust gas mass flow is adjusted within the exhaust gas recirculation line 1.5 via the EGR throttle valve 1.3. The exhaust gas flow is accordingly branched off downstream of the turbine 3 and flows upwards from below through the particle filter 1.2 as shown in FIG. 1.

When the gasoline engine 2 is in full load mode, or at least close to full load, the EGR throttle valve 1.3 is closed. The exhaust gas valve 1.9 is open anyway. Depending on the operating point, an exhaust gas mass flow is adjusted within the exhaust bypass line 1.1 via the bypass throttle valve 1.4. The particle filter 1.2 is flowed through in the opposite direction compared to EGR mode in the partial load, which leads to a purification of the filter through regeneration. The temperature of the exhaust gas flow in the bypass line 1.1 is sufficiently high for such a regeneration.

In general, due to the already existent oxygen excess in the exhaust gas 7, a regeneration of the particle filter 1.5, 5.2 is possible via oxidation of the filtered residues when the engine is in overrun mode.

According to the exemplary embodiment shown in FIG. 2, a bypass valve 6 is provided in the portion of the bypass line 1.1 that serves as an exhaust gas recirculation line 1.5. This serves to avoid a pulsation in the EGR path.

According to the exemplary embodiment shown in FIG. 3, a charge air recirculation line 9 is also provided, which can be used to recirculate charge air into the exhaust gas tract. The charge air recirculation line 9 has a throttle valve 9.3, a branch 9.1 downstream of a charge air cooler 2.5 and an opening 9.2 between the EGR cooler 1.6 and the EGR throttle valve 1.3. In regeneration mode, charge air can be fed to the particle filter 1.2 via the charge air recirculation line 9 and the EGR line 1.5.

An exhaust gas diversion 10 is also provided. The exhaust gas diversion 10 branches off from the portion 1.1' of the bypass line 1.1 downstream of the particle filter 1.2 at a branch 10.4 and branches back in the exhaust gas line 2.3 at an opening 10.5 between the particle filter 5.2 and the 3-way catalytic converter 5.1. Even when the exhaust gas diversion 10 is used, the bypass valve 6 is provided in the bypass line 1.1' downstream of the branch 10.4. Additionally, a first diversion valve 10.1 is provided upstream of the opening 10.5 via which the diversion 10 can be sealed off. When the bypass valve 6 is closed and the diversion valve 10.1 is open, the already purified exhaust gas 7 can be guided pass the 3-way catalytic converter 5.1 via the exhaust gas diversion 10.

In addition, a further diversion section 10.7 of the exhaust gas diversion 10 is provided (shown as a broken line). The diversion section 10.7 branches off between the branch 10.4 and the first diversion valve 10.1 and branches back at an opening 10.6 downstream of the particle filter 5.2. Additionally, the diversion section 10.7 has a second diversion valve 10.2, so that the purified exhaust gas flow can be recirculated into the exhaust gas line 2.3 either downstream of the particle filter 5.2 or between the 3-way catalytic converter 5.1 and the particle filter 5.2.

In the same way as for the recirculation of the exhaust gases 7, in regeneration mode, it is also possible to feed the charge air via the exhaust gas diversion 10 past the 3-way catalytic converter 5.1 to the particle filter 5.2 for regeneration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An exhaust gas conduction system for a gasoline engine comprising an exhaust gas line which can be connected to an exhaust manifold of the gasoline engine, an intake line which can be connected to an intake manifold of the gasoline engine, and comprising a charge air compressor, which is arranged in the intake line, and a turbine, which is arranged in the exhaust gas line, wherein the exhaust gas line has at least one bypass line with a bypass throttle valve, said line branching off from the exhaust gas line upstream of the turbine and branching back into the exhaust gas line at an opening downstream of the turbine, and wherein at least one exhaust gas recirculation line with an EGR throttle valve is provided, said recirculation line opening into the intake line, wherein the exhaust gas recirculation line branches off from the bypass line at a branch, wherein the bypass throttle valve is arranged upstream of the branch of the exhaust gas recirculation line, and wherein an exhaust gas valve is provided in the exhaust gas line upstream of the opening of the bypass line,
wherein
at least one particle filter is arranged in the bypass line downstream of the branch of the exhaust gas recirculation line, wherein an exhaust gas diversion is provided, which branches off at a split downstream of the particle filter and before the opening and which branches back into the exhaust gas line downstream of a 3-way catalytic converter and/or downstream of the particle filter.

2. The exhaust gas conduction system according to claim 1,
wherein
the at least one particle filter has a catalytically active 3-way coating for converting CO, HC and NOx.

3. The exhaust gas conduction system according to claim 1,
wherein
a cooler is provided within the exhaust gas recirculation line upstream of the EGR throttle valve.

4. The exhaust gas conduction system according to claim 1,
wherein
a 3-way exhaust gas catalytic converter and/or a particle filter is provided in the exhaust gas line downstream of the opening of the bypass line.

5. The exhaust gas conduction system according to claim 1,
wherein
downstream of the particle filter and upstream of the opening, the bypass line is free of exhaust gas valves or exhaust gas flaps, or that only one bypass valve is provided in the bypass line downstream of the particle filter and upstream of the opening.

6. The exhaust gas conduction system according to claim 1,
wherein
the bypass line is free of connection lines to the exhaust gas line upstream of the particle filter or upstream of the branch of the exhaust gas recirculation line.

7. The exhaust gas conduction system according to claim 1,
wherein
a charge air recirculation line is provided, which has a branch downstream of a charge air cooler and an opening between an EGR cooler and the EGR-throttle valve.

8. The exhaust gas conduction system according to claim 1,
wherein at least one first diversion valve is positioned between the split and the opening.

9. The exhaust gas conduction system according to claim 8,
wherein
a diversion section is provided, which branches off between the branch and the first diversion valve and which branches back downstream of the particle filter, wherein a second diversion valve is provided in the diversion section.

10. An exhaust gas system and/or gasoline engine comprising an exhaust gas conduction system according to claim 1.

11. A method for operating a gasoline engine comprising an exhaust gas conduction system or an exhaust gas system according to claim 1,
wherein
a) when the gasoline engine is in cold starting mode, the bypass throttle valve is open and the EGR throttle valve and the exhaust gas valve are closed, so that the exhaust gas flow is guided past the turbine through the bypass line and the particle filter,
b) when the gasoline engine is in partial load mode, the bypass throttle valve is closed and the exhaust gas valve is open, wherein depending on the operating point of the engine, an exhaust gas mass flow is adjusted within the exhaust gas recirculation line via the EGR throttle valve,
c) when the gasoline engine is in full load mode or at least close to full load mode, the EGR throttle valve is closed and the exhaust gas valve is open, wherein depending on the operating point of the engine, an exhaust gas mass flow is adjusted within the bypass line via the bypass throttle valve.

12. The method according to claim 11, wherein charge air is introduced into the exhaust gas line via a charge air recirculation line and the EGR line and the particle filter to regenerate the particle filter.

13. The exhaust gas conduction system according to claim 1, wherein the bypass line is at least partly provided upstream of the exhaust gas recirculation line.

14. An exhaust gas conduction system for a gasoline engine comprising an exhaust gas line which can be connected to an exhaust manifold of the gasoline engine, an intake line which can be connected to an intake manifold of the gasoline engine, and comprising a charge aft compressor, which is arranged in the intake line, and a turbine, which is arranged in the exhaust gas line, wherein the exhaust gas line has at least one bypass line with a bypass throttle valve, said line branching off from the exhaust gas line upstream of the turbine and branching back into the exhaust gas line at an opening downstream of the turbine, and wherein at least one exhaust gas recirculation line with an ERR throttle valve is provided, said recirculation line opening into the intake line, wherein the exhaust gas recirculation line branches off from the bypass line at a branch, wherein the bypass throttle valve is arranged upstream of the branch of the exhaust gas recirculation line, and wherein an exhaust gas valve is provided in the exhaust gas line upstream of the opening of the bypass line, wherein at least one particle filter is arranged in the bypass line downstream of the branch of the exhaust gas recirculation line, and wherein an exhaust gas diversion is provided, which branches off at a split downstream of the particle filter and before the opening, the exhaust gas diversion comprising at least one first diversion valve which is positioned between the split and the opening.

* * * * *